(No Model.) 3 Sheets—Sheet 1.
W. WEBSTER, Jr.
APPARATUS FOR PURIFYING WATER.
No. 387,467. Patented Aug. 7, 1888.
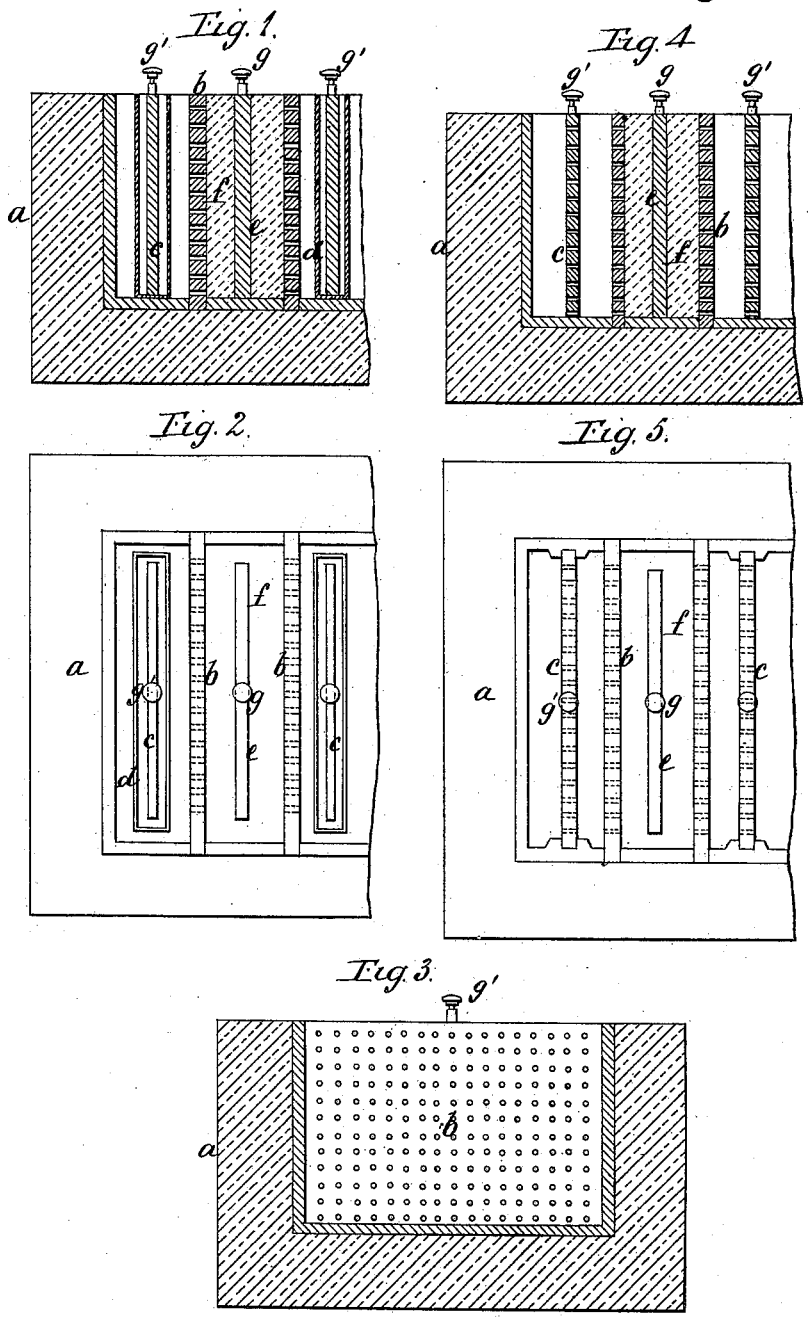

(No Model.) 3 Sheets—Sheet 2.
W. WEBSTER, Jr.
APPARATUS FOR PURIFYING WATER.
No. 387,467. Patented Aug. 7, 1888.
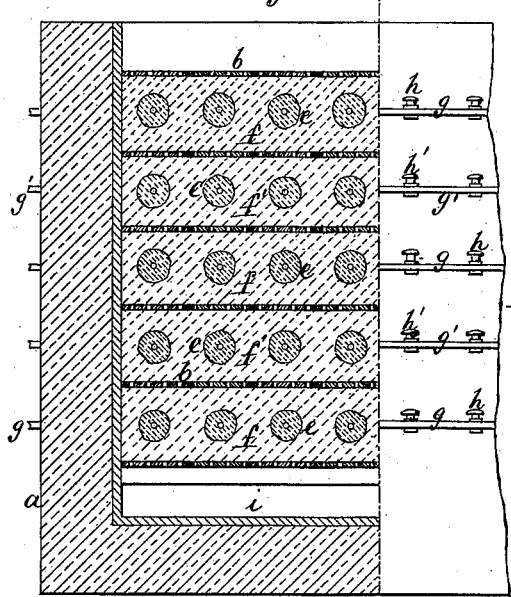
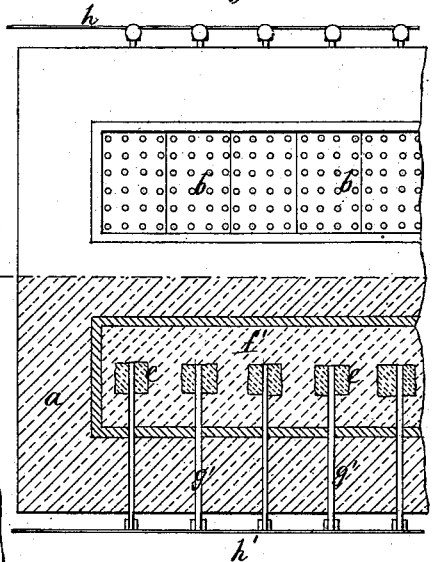
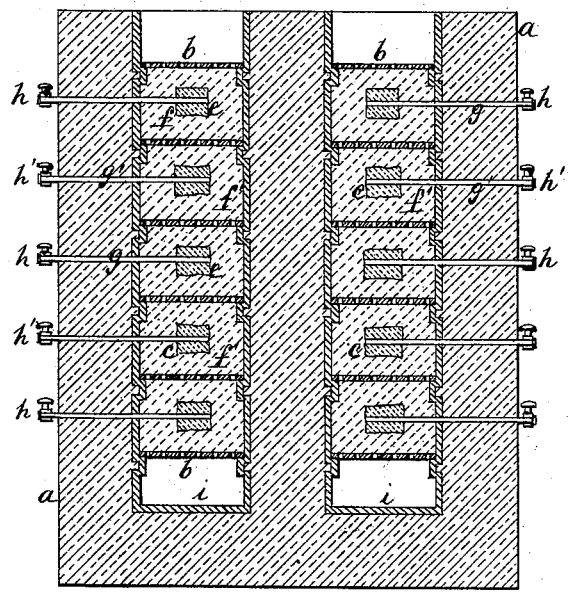
Witnesses
J. A. Rutherford
Robert Everett
Inventor:
William Webster Jr.
By James L. Norris
Atty.

(No Model.) 3 Sheets—Sheet 3.
W. WEBSTER, Jr.
APPARATUS FOR PURIFYING WATER.
No. 387,467. Patented Aug. 7, 1888.
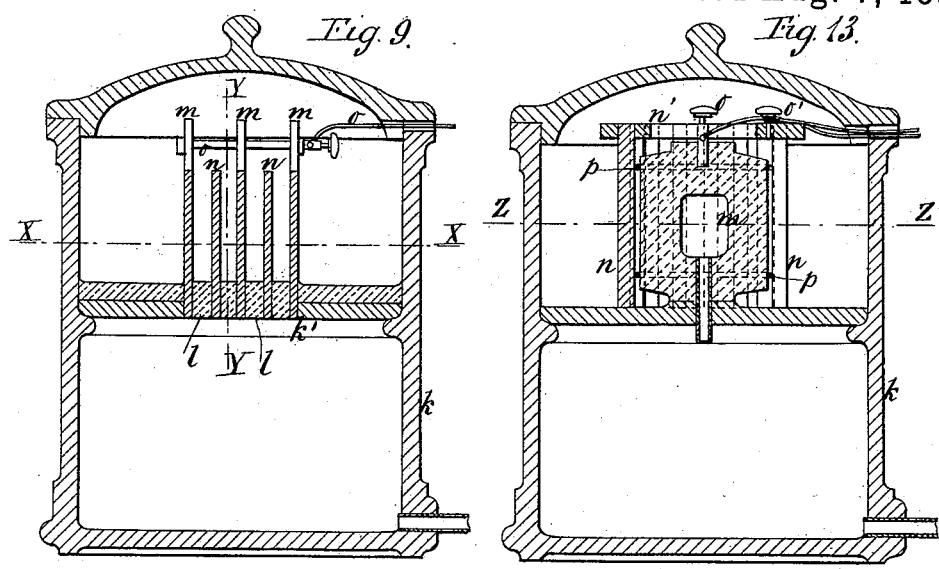
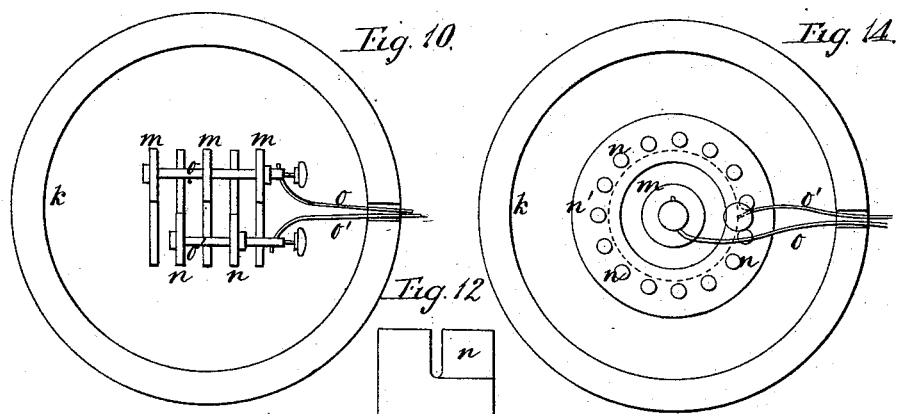
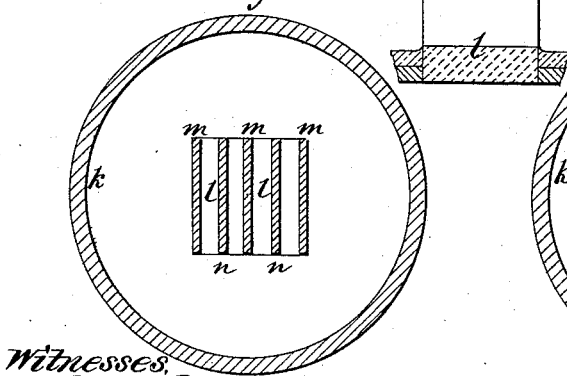
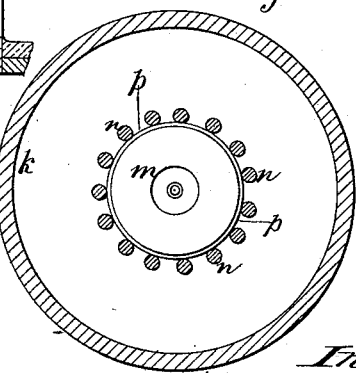
Witnesses
J. A. Rutherford
Robert Everett
Inventor
William Webster Jr.
By James L. Norris
Atty.

UNITED STATES PATENT OFFICE.

WILLIAM WEBSTER, JR., OF LEE PARK, LEE, COUNTY OF KENT, ENGLAND.

APPARATUS FOR PURIFYING WATER.

SPECIFICATION forming part of Letters Patent No. 387,467, dated August 7, 1888.

Application filed December 22, 1887. Serial No. 258,725. (No model.) Patented in England January 27, 1887, No. 1,333; in France December 9, 1887, No. 187,498; in Cape of Good Hope January 28, 1888, No. 436; in Natal February 2, 1888; in New South Wales February 10, 1888, No. 495; in Tasmania February 12, 1888, No. 540/10, and in India April 13/28, 1888, No. 16/522.

*To all whom it may concern:*

Be it known that I, WILLIAM WEBSTER, Jr., a citizen of England, residing at Lee Park, Lee, in the county of Kent, England, have invented a new and useful Improvement in Apparatus for Subjecting Water Containing Impurities to the Combined Action of Electrolysis and Filtration, (which has been patented in Great Britain January 27, 1887, No. 1,333; in France December 9, 1887, No. 187,498; in Cape of Good Hope January 28, 1888, No. 436; in Natal February 2, 1888; in New South Wales February 10, 1888, No. 495; in Tasmania February 12, 1888, No. 540/10, and in India April 13/28, 1888, No. 16/522,) of which the following is a specification.

My invention relates to apparatus for treating water intended for drinking and such like purposes by the combined action of electrolysis and filtration, the essential object of the invention being the production, by the electric action, of nascent oxygen with small quantities of nascent chlorine in the pores of the filtering medium, by means of which the albuminoid and other organic impurities that may be contained in potable water are most efficaciously decomposed.

The invention consists in the features of construction and combination of devices hereinafter described and claimed, reference being made to the accompanying drawings, in which—

Figure 1 is a longitudinal sectional view of part of an apparatus embodying my invention for treating larger bodies of water; Fig. 2, a top plan view, and Fig. 3 a transverse sectional view, of Fig. 1; Figs. 4 and 5, views similar to Figs. 1 and 2, showing slight modifications; Fig. 6, a sectional side elevation of a modified arrangement; Fig. 7, a sectional top plan view, and Fig. 8 a transverse sectional view, of Fig. 6; Fig. 9, a vertical sectional view showing the invention applied to a domestic filter; Fig. 10, a top plan of Fig. 9, omitting the cover of the filter; Fig. 11, a sectional view on the line X X, Fig. 9; Fig. 12, a detail sectional view on the line Y Y, Fig. 9; Fig. 13, a vertical sectional view showing a modification of the invention in a domestic filter; Fig. 14, a top plan view of Fig. 13, omitting the cover of the filter; and 15, a sectional view on the line Z Z, Fig. 13.

The tank or receiver $a$ is divided by transverse partitions $b$ of perforated tiles, or other suitable material, into separate compartments. In the first, third, fifth, &c., compartments are placed the negative carbon or iron electrodes $c$ contained in porous pots $d$, while in the second, fourth, sixth, &c., compartments are placed the positive carbon electrodes $e$, surrounded by the filtering medium $f$, which may be either coke or other suitable material, with which these compartments are filled.

The positive electrodes being connected to the positive pole of a generator by the conductor $g$, while the negative electrodes are connected to the negative pole by the conductor $g'$, the before-described electrolytic action will be set up as soon as water is made to flow through the several compartments, the porous pots $d$ being also filled with water—that is to say, the water on passing through each filtering-compartment $f$ will be brought into intimate contact with the nascent oxygen and chlorine evolved at the positive electrode, whereby the impurities contained therein will be effectually decomposed. The object of inclosing the negative electrode in a porous pot is to separate the free ammonia that may be given off at this electrode from the body of water flowing through. In the arrangement shown in part sectional elevation and part plan at Figs. 4 and 5, however, this separation is dispensed with, the negative carbon electrodes $c$ being formed as perforated partitions through which the water is made to flow, passing thence through the perforated tile partitions $b$ into the filters $f$ and in contact with the positive electrodes $e$.

In the arrangement shown in part side elevation and part longitudinal section at Fig. 6, part plan at Fig. 7, and cross-section at Fig. 8 there are a series of vertically-arranged coke-filters, $f f'$, separated by horizontal perforated-tile partitions $b b$, positive carbon electrodes in the form of blocks $e$ being embedded in the filters $f$, while negative carbon electrodes $c$ are embedded in the filters $f'$. Suitably-insulated conductors $g g'$ pass from the main leads $h h'$ through the sides of the tank to the electrodes c e. In this arrangement the water entering at the top of the apparatus is subjected to a continuous combined electrolytic and filtering action as it descends through the filtering-chambers, passing away at bottom through a passage, i.

Figs. 9, 10, 11, and 12 show the application of my invention to domestic filters. Fig. 9 shows a vertical section; Fig. 10, a plan with the cover removed; Fig. 11, a section on line X X, and Fig. 12 a part section on line Y Y. For this purpose any existing form of stoneware filter, k, is employed, the central aperture in the partition k' being filled in with any suitable porous filtering material, l, in which are embedded the lower ends of carbon electrodes m n, of which m m are connected by a conductor, o, to the positive pole of a battery or other electrical generator, while n n are connected by a conductor, o', to the negative pole. Thus the water in filtering through the material l will be subjected to the electrolytic action, as before.

Figs. 13, 14, 15 show, respectively, a vertical section, a plan, and a section at Z Z of another arrangement, in which the positive electrode m is formed by a carbon block such as is ordinarily used in domestic filters, so that the water passes through this electrode, which acts at the same time as a filter. The negative electrode n is formed by a number of carbon rods surrounding the block m, but kept from contact therewith by means of strings p, of non-conducting material—such as asbestus—secured round the block m. The upper ends of the rods n are fixed in a conducting-ring, n', to which the conductor o' is attached.

It will be evident that when treating sewage according to my invention it may, if desired, be passed through the herein-described electrolytic filtering apparatus after having been subjected to the first-described electrolytic precipitating and purifying process.

Having thus described the nature of this invention and the best means I know for carrying the same into practical effect, I claim—

1. In a water-filtering apparatus, a carbon filtering medium connected to the positive pole of an electric battery or other electrical generator whose negative pole is connected to the water in the filter, so that on the passage of the water through the filtering medium it is brought into intimate contact with nascent oxygen generated therein by the electric current, substantially as herein described.

2. Electrolytic filtering apparatus in which a filtering medium through which the water is passed either itself constitutes the positive electrode or has a positive electrode embedded in it, while the negative electrode is either also embedded in a filtering medium or is otherwise in electrical contact with the water to be filtered, substantially as herein described, with reference to the accompanying drawings.

In testimony whereof I have signed my name to this specification, in the presence of two subscribing witnesses, this 2d day of December, A. D. 1887.

WILLIAM WEBSTER, Jr.

Witnesses:
 CHAS. D. ABEL,
  *Patent Agent.*
 JNO. P. M. MILLARD,
*Clerk to Messrs. Abel & Imray, Consulting Engineers and Patent Agents, 28 Southampton Buildings, London, W. C.*